Oct. 14, 1924.

L. LANGHAAR

ANTIFRICTION BEARING

Filed Sept. 9, 1922

1,511,286

INVENTOR
Louis Langhaar.
by Arthur B. Jenkins
ATTORNEY

Patented Oct. 14, 1924.

1,511,286

UNITED STATES PATENT OFFICE.

LOUIS LANGHAAR, OF AURORA, INDIANA.

ANTIFRICTION BEARING.

Application filed September 9, 1922. Serial No. 587,073.

*To all whom it may concern:*

Be it known that I, Louis Langhaar, a citizen of the United States, and a resident of Aurora, in the county of Dearborn and State of Indiana, have invented new and Improved Antifriction Bearings, of which the following is a specification.

My invention relates to that class of bearings in which rolling members are provided as a means for reducing friction, and an object of my invention, among others, is to provide a bearing of this class having means to retain the rolling or anti-friction members in their proper positions in the raceways.

One form of bearing embodying my invention and in the construction and use of which the objects herein set out, as well as others, may be attained, is illustrated in the drawings in which—

Figure 1:
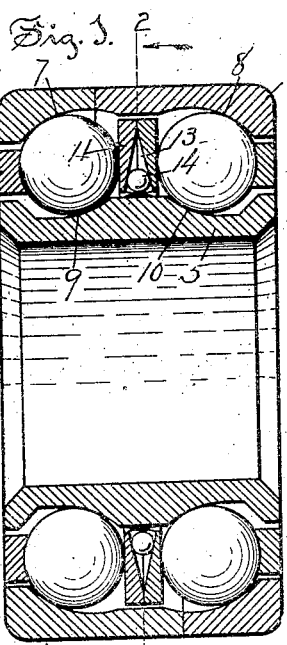
Figure 1 is a view in central longitudinal section through a bearing constructed in accordance with my invention.
Figure 2:
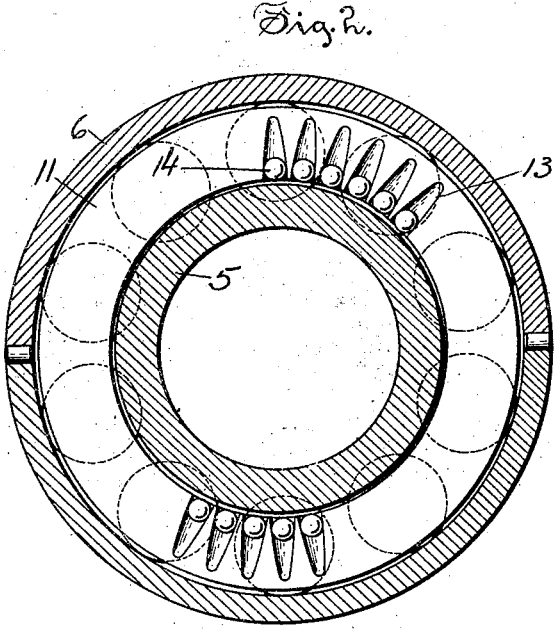
Figure 2 is a view in cross-section through the bearing on a plane noted by the dotted line 2—2, of Figure 1.

In any form of angular contact anti-friction bearing, adapted for any proportion of radial load, centrifugal force tends to crowd the anti-friction members toward the part of the outer raceway farthest from the bearing axis; and in so doing tends to cause a translation of the anti-friction members also longitudinally of the shaft axis. Tendency to move must not be confused with any measureable or noticeable movement. The anti-friction members in such a case will move outwards and sideways unless positively resisted.

Resilient means for keeping the balls of a ball bearing in contact with the races are shown in my Patent No. 1,199,577 of September 26, 1916, and my Patent No. 1,310,-756 of July 22, 1919. Bearings of the type shown in said patents are frequently used at high speeds, so that the effect of centrifugal force on the balls must be considered. For example in bearings such as are used in present day wood-working machines, at speeds of 5,000 to 10,000 revolutions per minute, the bearings are large and the centrifugal force of each ball is sometimes fifty pounds or more. Centrifugal force varies as the square of the speed, therefore a speed difference which may appear negligible to an ordinary mechanic may mean a great variation in centrifugal force.

In a bearing in which the resilient member is arranged as in the before mentioned Patent No. 1,199,577, the effect of centrifugal force is to reduce the tension of the resilient member. In bearings like that shown in the before mentioned Patent No. 1,310,756, the resilient member should be proportioned to the maximum speed at which the bearing will be used; because centrifugal force tends to squeeze the ball rows together. This involves difficulties in specifying and in using the bearings, frequently complicated by the unwillingness or inability of the users to state their maximum requirements, and by the lack of realization by laymen of precautions to be properly observed.

My improved bearing, forming the subject matter of this application, overcomes many of the difficulties presented in the bearings of my former patents hereinbefore mentioned, by employing centrifugal force as an agent to retain the anti-friction members in their proper places in the ball race.

In the accompanying drawings the numeral 5 indicates the inner or cone member and 6 the outer or case member of a ball bearing of well-known construction, each of these members having a double raceway, comprising grooves 7—8—9 and 10 formed in the members at each end thereof in a manner that will be readily understood.

In order to obtain proper rolling action between the bearing members and the balls, it is essential that the balls shall be retained so that they will roll in certain paths in the raceways, and in order to do this some force is required to retain the balls for travel in such paths, such an element comprising, in the structure shown herein, a retaining ring 11. Ball separators 12 of any well-known construction may be employed to keep the balls properly spaced in a circumferential direction.

All of the elements thus far described are set forth in my previous patents hereinabove mentioned, and therefore except in connection with parts to be hereinafter described, form no part of my present invention.

In the structures of my said prior patents, the retaining ring 11 comprised two members, as illustrated in Figure 1, said members having spring acting elements between them to force them toward the balls.

In adapting this structure to my present invention, I provide recesses 13 in the meeting faces of each member of the retaining ring 11, these recesses or grooves being deeper at their mouths at the inner edge of said members than at the outer edge. Restraining members 14 are placed in each of these recesses, these restraining members comprising balls freely movable within the recesses when the members of the retaining ring are separated enough to permit such movement.

The operation of this will be readily understood, it being noted that the restraining members comprise weights, or a series of weights, and the recesses receiving such weights permitting the free action of centrifugal force to cause the weights or restraining members to press outward from the bearing axis and thereby cause the ring sections to tend to move apart, thereby keeping the balls in contact with the race by a force proportional to the square of the speed and neutralizing the tendency of the ball rows to crowd together. The novelty and value of this construction lies in utilizing centrifugal force to compensate the effects of centrifugal force and to make a bearing wherein speed variations may be disregarded in that respect.

While the weights or restraining members above described are in the form of balls, it will be understood that they may be of various forms, and the ring sections may be of various numbers and forms without affecting the spirit and intent of the invention, provided the action of the adjusting unit is to tend to make the rows of anti-friction members retain proper positions in a bearing comprising two or more rows of anti-friction members. It will be noted that the members of the retaining ring each have a smooth continuous surface in contact with the anti-friction members so that said retaining ring is adapted for rotation about the bearing axis independently of the anti-friction members.

Figure 3:
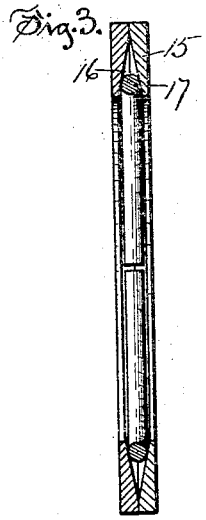
Figure 3 is a detail view in longitudinal section through the restraining ring showing a little different form of construction from that illustrated in Figures 1 and 2.
Figure 4:
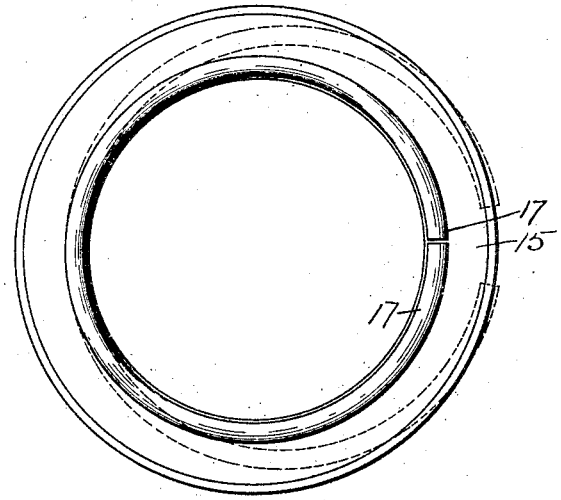
Figure 4 is a view in side elevation of one of the members of the restraining ring illustrating the operation of a restraining member shown in Figure 3.

In that form of invention illustrated in Figures 3 and 4, the retaining ring comprises two members 15 with a tapered annular groove 16 between them, and in this groove a resilient restraining member 17 is placed. This restraining member is in the form of a split ring so constructed that its tendency is to expand. The resiliency provides a certain initial tension or adjustment and centrifugal force adds to the expansive force of such resilient member and thereby acts the same as in the case of a weight or weights. It is desirable to have initial spring tension for low speeds. Centrifugal force automatically provides compensation for higher speeds and thereby supplies a bearing of universal automatic speed range.

In accordance with the provisions of the patent statutes I have described the principles of operation of my invention, together with the device which I now consider to represent the best embodiment thereof; but I desire to have it understood that the device shown is only illustrative and that the invention may be carried out by other means.

I claim—

1. An anti-friction bearing comprising inner and outer race members with a plurality of raceways between them, anti-friction members arranged in a row in each of said raceways, and a composite member having continuous surfaces in contact with the anti-friction members and adapted for an independent rate of rotation about the bearing axis located between said rows of anti-friction members and centrifugally acting to force said rows apart and thereby to tend to keep the anti-friction members in proper contact with both the inner and outer raceways at different speeds of the bearing.

2. An anti-friction bearing comprising inner and outer race members with a plurality of raceways between them, a plurality of substantially parallel rows of anti-friction members disposed in said raceways, an independent expansible device having continuous surfaces in contact with the anti-friction members and adapted for an independent rate of rotation about the bearing axis between the rows of anti-friction members, and means influenced by centrifugal force to expand the said device to exert pressure against both rows of anti-friction members.

3. An anti-friction bearing comprising inner and outer race members with a plurality of raceways between them, a plurality of rows of anti-friction members in said raceways, an independent device having continuous surfaces in contact with the anti-friction members and adapted for an independent rate of rotation about the bearing axis comprising a resilient section arranged to create an initial pressure upon said rows of anti-friction members, said resilient member being arranged to utilize centrifugal force for increased pressure against said rows of anti-friction members.

4. An anti-friction bearing comprising inner and outer race members with a plurality of raceways between them, a plurality of rows of anti-friction members in said raceways, an independent device having continuous surfaces in contact with the anti-friction members and adapted for an independent rate of rotation about the bearing axis adapted to contact with two rows of said anti-friction members to separate them, and means acting to create a greater separating tendency as the speed of the bearing is increased.

5. A ball bearing comprising inner and outer race members with a plurality of raceways between them, two sets of balls in said raceways with their paths of travel on the outer race member further apart than their paths of travel on the inner race member, an independent device having continuous surfaces in contact with the anti-friction members and adapted for an independent rate of rotation about the bearing axis located in the space between the two sets of balls to hold them apart and means to resist separating tendency of said ball sets, said independent device having means to exert an increased pressure against both sets of balls as the speed of the bearing increases.

6. A ball bearing comprising inner and outer race members with a plurality of co-operative opposed raceways, sets of opposed rows of balls in said raceways, means influenced by centrifugal force to tend to cause said ball sets to approach each other, and an independent composite device having continuous surfaces in contact with the anti-friction members and adapted for an independent rate of rotation about the bearing axis between said opposed races and in contact with two rows of balls to prevent them from approaching each other, said composite device having means influenced by centrifugal action on some part thereof as the speed of the bearing is increased to exert an increased pressure against both of said ball rows.

7. An anti-friction bearing comprising inner and outer race members with a plurality of raceways between them, anti-friction members arranged in a row in each of said raceways, said raceways being formed to cause the anti-friction members in one raceway to move toward those in the other raceway, a retaining ring comprising two members with facing sloping walls, and a restraining member located between the members of said retaining ring to force the latter apart by centrifugal force.

8. An anti-friction bearing comprising inner and outer race members with a plurality of raceways between them, anti-friction members arranged in a row in each if said raceways, said raceways being formed to cause the anti-friction members in one raceway to move toward those in the other raceway, a retaining ring comprising two members with pockets in each member having sloping walls facing those in the opposite member, and a restraining member located in each of said pockets to force the members of the retaining ring apart by centrifugal force.

LOUIS LANGHAAR.